(12) United States Patent
Veenstra

(10) Patent No.: US 7,704,070 B2
(45) Date of Patent: Apr. 27, 2010

(54) HEAT TRANSFER SYSTEM FOR THE COMBUSTION OF A FUEL HEATING OF A PROCESS FLUID AND A PROCESS THAT USES SAME

(75) Inventor: Peter Veenstra, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 972 days.

(21) Appl. No.: 11/371,889

(22) Filed: Mar. 9, 2006

(65) Prior Publication Data

US 2006/0210468 A1 Sep. 21, 2006

Related U.S. Application Data

(60) Provisional application No. 60/660,446, filed on Mar. 10, 2005.

(51) Int. Cl.
*B01J 19/00* (2006.01)
(52) U.S. Cl. .................. 431/181; 431/177; 431/187; 431/354; 126/263.01; 126/263.02; 126/91 A; 48/127.9; 422/197; 422/198; 422/204
(58) Field of Classification Search ........... 48/127.9; 422/46, 197, 198, 200, 204, 215, 652; 431/6, 431/11, 181, 207, 243; 126/91 A; 166/57, 166/59, 65.1, 66, 250, 251.1, 256, 257, 302
See application file for complete search history.

(56) References Cited

U.S. PATENT DOCUMENTS

| | | | | |
|---|---|---|---|---|
| 1,920,124 A | * | 7/1933 | Gillis | 431/243 |
| 2,196,229 A | * | 4/1940 | Prickett | 422/189 |
| 2,772,737 A | | 12/1956 | Bond et al. | 166/22 |
| 2,819,761 A | * | 1/1958 | Popham et al. | 166/257 |
| 2,902,270 A | | 9/1959 | Salomonsson et al. | 262/3 |
| 3,113,623 A | * | 12/1963 | Krueger | 166/59 |
| 3,376,932 A | * | 4/1968 | Hunt | 166/59 |
| 3,519,396 A | | 7/1970 | Eagle et al. | 23/277 |
| 3,527,052 A | | 9/1970 | Bryce | 60/39.65 |
| RE26,990 E | | 11/1970 | Bongiorno | 252/373 |
| 3,810,732 A | | 5/1974 | Koch | 431/7 |
| 3,927,987 A | * | 12/1975 | Winter et al. | 422/200 |

(Continued)

FOREIGN PATENT DOCUMENTS

CN 87103900 12/1988

(Continued)

OTHER PUBLICATIONS

Khimicheskaya Entsiklopediya, M., Great Russian Encyclopedia. 508, with English translation.

*Primary Examiner*—Steven B McAllister
*Assistant Examiner*—Daniel E Namay

(57) ABSTRACT

A heat transfer system and use thereof. The heat transfer system provides for the combustion of a fuel and the use of heat energy released by the combustion to heat a process fluid and to preheat the fuel and oxidant prior to their combustion. The heat transfer system includes three tubes with a fuel introduction tube surrounded by an oxidant introduction tube that is surrounded by a process tube. A heat transfer system having the appropriate geometry may provide for the flameless combustion of the fuel. The heat transfer system may also be integrated into other systems such as heat exchangers and catalytic process systems.

9 Claims, 3 Drawing Sheets

U.S. PATENT DOCUMENTS

| Patent No. | | Date | Inventor | Class |
|---|---|---|---|---|
| 4,029,146 A | | 6/1977 | Hart et al. | 165/166 |
| 4,104,018 A | * | 8/1978 | McKay | 432/29 |
| 4,273,188 A | | 6/1981 | Vogel et al. | 166/256 |
| 4,353,712 A | * | 10/1982 | Marion et al. | 48/197 R |
| 4,392,869 A | * | 7/1983 | Marion et al. | 48/197 R |
| 4,400,179 A | * | 8/1983 | Marion et al. | 48/86 R |
| 4,692,306 A | | 9/1987 | Minet et al. | 422/49 |
| 4,818,371 A | | 4/1989 | Bain et al. | 208/106 |
| 4,909,808 A | * | 3/1990 | Voecks | 48/94 |
| 4,928,605 A | * | 5/1990 | Suwa et al. | 110/261 |
| 4,946,667 A | * | 8/1990 | Beshty | 423/648.1 |
| 5,008,085 A | * | 4/1991 | Bain et al. | 422/109 |
| 5,154,599 A | | 10/1992 | Wunning | 431/215 |
| 5,181,990 A | | 1/1993 | Arisaki et al. | 196/110 |
| 5,255,742 A | * | 10/1993 | Mikus | 166/303 |
| 5,306,481 A | | 4/1994 | Mansour et al. | 423/652 |
| 5,321,191 A | | 6/1994 | Alagy et al. | 585/648 |
| 5,330,970 A | | 7/1994 | Reid et al. | 507/90 |
| 5,424,095 A | | 6/1995 | Clark et al. | 427/237 |
| 5,426,655 A | | 6/1995 | Feig | 371/49.3 |
| 5,427,655 A | | 6/1995 | Woebcke et al. | 196/138 |
| 5,433,271 A | | 7/1995 | Vinegar et al. | 166/272 |
| 5,446,229 A | | 8/1995 | Taylor et al. | 585/648 |
| 5,463,159 A | | 10/1995 | Callejas et al. | 585/648 |
| 5,513,981 A | * | 5/1996 | Harbeck et al. | 431/263 |
| 5,523,502 A | | 6/1996 | Rubin | 585/324 |
| 5,536,488 A | | 7/1996 | Mansour et al. | 423/652 |
| 5,554,347 A | | 9/1996 | Busson et al. | 422/204 |
| 5,559,510 A | | 9/1996 | Strong, III et al. | 340/954 |
| 5,567,305 A | | 10/1996 | Jo | 208/48 R |
| 5,600,051 A | | 2/1997 | Baker et al. | 585/648 |
| 5,743,723 A | * | 4/1998 | Iatrides et al. | 431/8 |
| 5,871,343 A | * | 2/1999 | Baukal et al. | 431/10 |
| 5,997,594 A | * | 12/1999 | Edlund et al. | 48/76 |
| 6,153,152 A | | 11/2000 | Ruhl et al. | 422/197 |
| 6,221,117 B1 | * | 4/2001 | Edlund et al. | 48/76 |
| 6,269,882 B1 | * | 8/2001 | Wellington et al. | 166/303 |
| 6,296,686 B1 | * | 10/2001 | Prasad et al. | 95/51 |
| 6,402,988 B1 | * | 6/2002 | Gottzmann et al. | 252/373 |
| 6,749,021 B2 | | 6/2004 | Vinegar et al. | 166/245 |
| 6,783,741 B2 | * | 8/2004 | Edlund et al. | 422/191 |
| 6,796,789 B1 | | 9/2004 | Gibson et al. | 431/2 |
| 6,877,554 B2 | | 4/2005 | Stegemeier et al. | 166/245 |
| 6,951,247 B2 | * | 10/2005 | de Rouffignac et al. | 166/245 |
| 6,966,372 B2 | * | 11/2005 | Wellington et al. | 166/245 |
| 7,025,940 B2 | * | 4/2006 | Shah et al. | 422/198 |
| 7,037,472 B2 | * | 5/2006 | Komiya et al. | 422/197 |
| 7,063,145 B2 | | 6/2006 | Veenstra et al. | 166/250.01 |
| 7,108,730 B2 | * | 9/2006 | Shah et al. | 48/203 |
| 7,121,342 B2 | | 10/2006 | Vinegar et al. | 166/302 |
| 2002/0015670 A1 | * | 2/2002 | Shah et al. | 422/198 |
| 2002/0027001 A1 | | 3/2002 | Wellington et al. | 166/59 |
| 2003/0101650 A1 | * | 6/2003 | Okada et al. | 48/62 R |
| 2003/0101651 A1 | * | 6/2003 | Weedon | 48/197 R |
| 2003/0182858 A1 | * | 10/2003 | Shah et al. | 48/127.9 |
| 2004/0022724 A1 | | 2/2004 | Robb | 423/651 |
| 2004/0033455 A1 | | 2/2004 | Tonkovich et al. | 431/7 |
| 2004/0057898 A1 | * | 3/2004 | Singh et al. | 423/652 |
| 2004/0185398 A1 | | 9/2004 | Butler | 431/2 |
| 2004/0265224 A1 | * | 12/2004 | Papavassiliou et al. | 423/651 |
| 2005/0178064 A1 | * | 8/2005 | Maruko | 48/198.7 |
| 2005/0223643 A1 | | 10/2005 | Butler | 48/94 |
| 2006/0000395 A1 | * | 1/2006 | Joshi et al. | 110/267 |
| 2006/0021280 A1 | | 2/2006 | Hamilton et al. | 48/127.9 |
| 2006/0199119 A1 | | 9/2006 | Abbasi et al. | 431/8 |
| 2006/0199127 A1 | | 9/2006 | Butler | 431/215 |
| 2006/0210468 A1 | | 9/2006 | Veenstra | 423/456 |
| 2006/0210936 A1 | | 9/2006 | Veenstra | 431/11 |
| 2006/0222578 A1 | | 10/2006 | Veenstra et al. | 422/198 |
| 2006/0248800 A1 | * | 11/2006 | Miglin et al. | 48/198.7 |
| 2007/0131411 A1 | * | 6/2007 | Vinegar et al. | 166/59 |
| 2007/0151152 A1 | | 7/2007 | Mukai et al. | 48/127.9 |
| 2007/0175094 A1 | | 8/2007 | Reinke et al. | 48/127.9 |
| 2007/0254251 A1 | | 11/2007 | Cao et al. | 431/10 |
| 2008/0244973 A1 | * | 10/2008 | Higashino | 48/127.9 |

FOREIGN PATENT DOCUMENTS

| | | |
|---|---|---|
| DE | 3222347 | 1/1983 |
| EP | 450872 | 10/1991 |
| EP | 0962422 | 12/1999 |
| GB | 2111181 | 5/1982 |
| JP | 271834 | 3/1990 |
| WO | WO2004022480 | 3/2004 |
| WO | 2004/059208 A2 | 7/2004 |
| WO | WO2005090230 | 9/2005 |

* cited by examiner

HEAT TRANSFER SYSTEM FOR THE COMBUSTION OF A FUEL HEATING OF A PROCESS FLUID AND A PROCESS THAT USES SAME

This application claims the benefit of U.S. Provisional Application No. 60/660,446, filed Mar. 10, 2005 which is hereby incorporated by reference.

The invention relates to a heat transfer system for the combustion of a fuel and for the heating of a process fluid. In another aspect, the invention relates to the use of a heat transfer-system for the flameless combustion of a fuel to directly heat a process fluid that is to be used in a process.

U.S. Pat. No. 4,692,306 discloses a concentric tube catalytic reaction apparatus that includes an annular reaction chamber that surrounds a convection chamber which surrounds a burner chamber. Within the burner chamber is a burner assembly providing a radiating heat source for releasing heat for transfer to the reaction chamber.

EP 0 450 872 B1 discloses several types of reaction apparatuses one of which includes a combustion tube that surrounds a fuel tube having perforations at spaced intervals along its length. Fuel is fed via the fuel tube and its perforations into the annulus between the fuel tube and the combustion tube wherein it mixes with air and ignites to release heat that is used to heat the catalyst bed that surrounds the combustion tube.

U.S. Pat. No. 5,255,742 discloses a method of heating a subterranean formation using a flameless combustion apparatus. The apparatus includes a fuel gas conduit containing a plurality of orifices. The fuel gas conduit is centralized within a combustion air conduit to form a first annulus between the fuel gas conduit and the combustion air conduit. The orifices provide for fluid communication between the fuel gas conduit and the first annulus. The combustion air conduit is centralized within a wellbore casing to thereby form a second annulus between the combustion air conduit and the wellbore casing. Fuel gas is introduced into the first annulus via the orifices of the fuel gas conduit to mix with the air and to combust within the first annulus. The first annulus formed by the combustion air conduit is in fluid communication with the second annulus between the combustion air conduit and the wellbore casing. This fluid communication provides a flow path for the combustion gases to be introduced into the second annulus and to travel up the second annulus to the surface to thereby provide heat that is transferred to a subterranean formation.

U.S. Publication No. 2003/0182858 describes a method for providing controlled heat to a process fluid by utilizing a flameless distributed combustion device. The device includes a fuel conduit containing a plurality of fuel nozzles distributed along its length and a surrounding oxidation chamber. A conduit that surrounds the fuel conduit forms the oxidation chamber. The device further includes a process chamber that surrounds the oxidation chamber. The fuel nozzles provide communication from within the fuel conduit to the oxidation chamber wherein the oxidant and fuel are mixed and the fuel combusted. The heat released from the combustion is transferred to the process chamber.

An object of the invention is to provide for the combustion of a fuel and the direct transfer of heat that is released therefrom to a process fluid.

Accordingly, a process system is provided that includes a fuel tube, an oxidant tube, and a process tube. The fuel tube has a length and a tube wall that define a fuel introduction zone wherein along said length and within said fuel introduction zone is included a fuel preheating zone and a combustion zone, wherein said fuel preheating zone includes a fuel inlet for introducing said fuel into said fuel preheating zone and a fuel outlet for introducing a preheated fuel from said fuel preheating zone into said combustion zone, and wherein along said combustion zone and through said tube wall is a plurality of apertures. The oxidant tube is external to and surrounds said fuel tube so as to thereby define an oxidant introduction zone along said length of said fuel tube, wherein said oxidant introduction zone includes an oxidant preheating zone and a fuel combustion zone, wherein said oxidant preheating zone includes an oxidant inlet for introducing an oxidant into said oxidant preheating zone and an oxidant outlet for introducing a preheated oxidant from said oxidant preheating zone into said fuel combustion zone, and wherein said plurality of apertures provide for fluid communication between said combustion zone and said fuel combustion zone. The process tube that is external to and surrounds said oxidant tube so as to thereby define a process fluid introduction zone along said oxidant tube, wherein said process fluid introduction zone includes a process fluid heating zone and an oxidant/fuel heating zone, wherein said process fluid heating zone is in heat exchange relationship with said fuel combustion zone and includes a process fluid inlet for introducing said process fluid into said process fluid heating zone and a process fluid outlet for introducing a heated process fluid from said process fluid heating zone into said oxidant/fuel heating zone, and wherein said oxidant/fuel heating zone is in heat exchange relationship with both of said oxidant preheating zone and said fuel preheating zone and includes a discharge outlet for discharging from said oxidant/fuel heating zone said heated process fluid.

Also, a process is provided for the direct heating of a process fluid by the flameless combustion of a fuel. A fuel is introduced into a fuel tube having a length and a tube wall that define a fuel introduction zone wherein along said length and within said fuel introduction zone is included a fuel preheating zone and a combustion zone, wherein said fuel preheating zone includes a fuel inlet for introducing said fuel into said fuel preheating zone and a fuel outlet for introducing a preheated fuel from said fuel preheating zone into said combustion zone, and wherein along said combustion zone and through said tube wall is a plurality of apertures. An oxidant is introduced into an oxidant tube that is external to and surrounding said fuel tube so as to thereby provide an oxidant introduction zone along said length of said fuel tube, wherein said oxidant introduction zone includes an oxidant preheating zone and a fuel combustion zone, wherein said oxidant preheating zone includes an oxidant inlet for introducing said oxidant into said oxidant preheating zone and an oxidant outlet for introducing a preheated oxidant from said oxidant preheating zone into said fuel combustion zone, and wherein said plurality of apertures provide for fluid communication between said combustion zone and said fuel combustion zone. A process fluid is introduced into a process tube that is external to and surrounding said oxidant tube so as to thereby provide a process fluid introduction zone along said oxidant tube, wherein said process fluid introduction zone includes a process fluid heating zone and an oxidant/fuel heating zone, wherein said process fluid heating zone is in heat exchange relationship with said fuel combustion zone and includes a process fluid inlet for introducing said process fluid into said process fluid heating zone and a process fluid outlet for introducing a heated process fluid from said process fluid heating zone into said oxidant/fuel heating zone, and wherein said oxidant/fuel heating zone is in heat exchange relationship with both of said oxidant preheating zone and said fuel preheating zone and includes a discharge outlet for discharging from said oxidant/fuel heating zone said heated process fluid. The heated process fluid is discharged from said oxidant/fuel heating zone, and a combustion exhaust is discharged from said fuel combustion zone.

Figure 1:
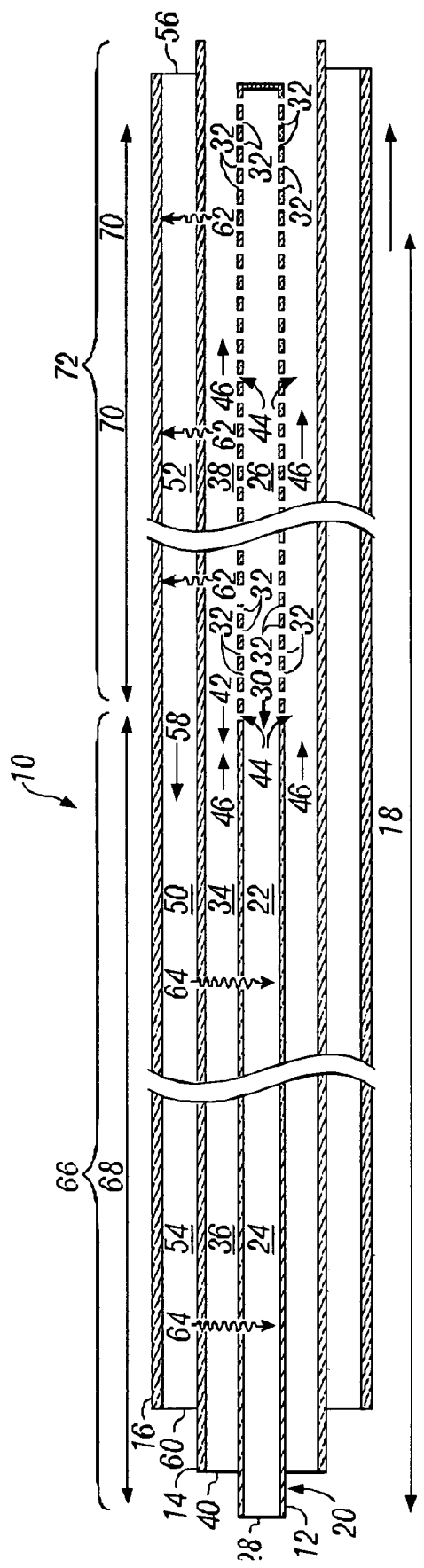
FIG. 1 is a sectional view of elements of the heat transfer system for the combustion of a fuel and for the heating of a process fluid.

The invention provides a heat transfer system or device that may be used in the direct transfer of heat energy released by the combustion of a fuel, preferably by flameless combustion, to a process fluid. The heat transfer system has many possible uses and applications, but, in particular, the use of a direct heating system such as the one described in detail in this specification may be especially beneficial in endothermic dehydrogenation processes such as processes for the dehydrogenation of ethylbenzene to yield a styrene product. Other processes that may productively or suitably exploit the advantages of the heat transfer system may include steam reforming and olefins cracking.

For instance, the direct heating system of the invention may provide for the controlled rate of fuel introduction through a fuel tube to a combustion zone in a manner so as to provide for a uniform combustion of the fuel along the fuel tube. This uniform combustion may provide for a uniform temperature profile along the fuel tube. This combustion may provide for a controlled temperature profile through the combustion zone. Some benefits that may be realized include, but are not limited to, reducing steam usage, operating at higher throughputs, increasing yields and selectivity, decreasing coke make, and increasing the pressure of the operation.

The direct heating system may also provide for flameless combustion of a fuel with released heat to be transferred to a process fluid. Because there is no flame associated with the flameless combustion of the fuel, the oxidation reaction (i.e., the flameless combustion) occurs at a relatively low temperature as compared to the flame temperatures observed in conventional combustion and heat transfer devices such as those that occur in conventional fired heaters. While the temperature of the flameless oxidation of a fuel may vary depending upon the fuel that is combusted, it may typically be in the range of from about 600° C. to about 1100° C., or from about 750° C. to about 1050° C. as opposed to the flame temperatures observed in the conventional burning of fuels that typically exceeds 1650° C.

The direct heating system of the invention may also provide for heat transfer to a process stream that is to be heated in a manner so as to provide a heat transfer efficiency that exceeds that of conventional heating systems. One of the features of the invention is that it provides for the direct heating of a process stream in that the process fluid is in contact with the outer surface of a combustion tube within which fuel combustion occurs. The process stream is contained by a process sleeve or conduit or tube that surrounds the combustion tube to provide a process zone that may be a process annulus formed by the process tube surrounding the combustion tube. Heat transfer to the process fluid is maximized by providing for both convection and radiant heat transfer with the process sleeve providing for a second heat radiating surface to that of the combustion tube surface.

Now referring to FIG. 1, presented is a sectional view of elements of the heat transfer system 10. The heat transfer system 10 includes a fuel tube 12, an oxidant tube 14, and a process tube 16. The fuel tube 12, oxidant tube 14, and process tube 16 may have any suitable geometry that provides for a conduit. In typical embodiments, the tubes may be made from any suitable commercially available pipe stock or square or rectangular tube stock. For example, the tubes may be standard pipe, according to the ANSI/ASME B36.10M standard, the European DIN 2448 standard, or any other standard. Non-limiting examples of such suitable standard pipe include: ¾ inch schedule 40 pipe as defined by the ANSI/ASME B36.10M standard (DN 20 as defined by the DIN 2448 standard), which may be used for the fuel tube 12; 3 inch schedule 40 pipe as defined by the ANSI/ASME B36.10M standard (DN 80 as defined by the DIN 2448 standard), which may be used for the oxidant tube 14; and 5 inch schedule 40 pipe as defined by the ANSI/ASME B36.10M standard (DN 125 as defined by the DIN 2448 standard), which may be used for the process tube 16. While the previously listed standard pipes are presented as examples, any suitable pipe may be used for the tubes of the heat transfer system 10, including schedule 80 and higher or lower schedules of pipe. The sizes of the pipes that may suitably be used may range from 13 mm (½ inch) to 250 mm (10 inch) or even larger.

The fuel tube 12 has a length 18 and a tube wall 20 that define a fuel introduction zone 22. The fuel introduction zone 22 extends through the length 18 of fuel tube 12. Included within the fuel introduction zone 22 is fuel preheating zone 24 and combustion zone 26. In typical embodiments, the fuel preheating zone and the combustion zone are at the ends of the fuel introduction zone. Fuel preheating zone 24 extends from the fuel inlet 28 to fuel outlet 30. Fuel outlet 30 provides for fluid communication between fuel preheating zone 24 and combustion zone 26, and it may be an imaginary transition area within the fuel tube 12 from one zone to another zone. The fuel preheating zone 24 also extends from the fuel inlet 28 through a sufficient amount of the length 18 of the fuel tube 12 to provide for the preheating of the fuel that passes through the fuel tube 12 prior to its mixing with an oxidant.

The fuel inlet 28 provides for the introduction of the fuel into the fuel preheating zone 24 and as the fuel passes through the fuel preheating zone 24, heat energy is transferred into the fuel. The fuel outlet 30 provides for the introduction of the preheated fuel passing from the fuel preheating zone 24 into the combustion zone 26. Any suitable fluid that is combustible in the presence of an oxidant, such as oxygen or air, may be used in the operation of the heat transfer system 10. Examples of such fuels include hydrogen and hydrocarbons. The hydrocarbons that may be used as a fuel include those hydrocarbons having from one to six carbon atoms, including, methane, ethane, ethylene, propane, propylene, propyne, butane, butylene, and butyne. Preferred fuels include hydrogen, methane, ethane and mixtures thereof. Steam may be added to the fuel to prevent or inhibit formation of coke.

The oxidant tube 14 is external to and surrounds fuel tube 12 in a manner so as to define an oxidant introduction zone 34 along the length 18 of fuel tube 12. The oxidant introduction zone 34 provides a conduit through which an oxidant fluid, such as a fluid comprising oxygen or air, may pass. Included within the oxidant introduction zone 34 are an oxidant preheating zone 36 and a fuel combustion zone 38. In typical embodiments, the oxidant preheating zone and the fuel combustion zone are at the ends of the oxidant introduction zone. The oxidant preheating zone 36 extends from oxidant inlet 40 to oxidant outlet 42. Oxidant outlet 42 provides for fluid communication between the oxidant preheating zone 36 and fuel combustion zone 38, and it may be an imaginary transition area within the oxidant tube 14 from one zone to another zone. The oxidant preheating zone 36 extends along a portion of the length 18 of the fuel tube 12 from the oxidant inlet 40 through a sufficient length or a portion of the oxidant introduction zone 34 so as to provide for the desired preheating of the oxidant passing through the oxidant introduction zone 34 to the oxidant outlet 42. The oxidant inlet 40 provides for the introduction of the oxidant fluid into the oxidant preheating zone 36 and, as the oxidant passes through the oxidant preheating zone 36, heat energy is transferred into the oxidant to give a preheated oxidant. The oxidant outlet 42 also provides for the introduction of the preheated oxidant passing from the oxidant preheating zone 36 into the fuel combustion zone 38.

Through the tube wall 20 of the combustion zone 26 of the fuel tube 12 is provided a plurality of apertures 32. The apertures 32 are spaced apart along a portion of the length 18 of the fuel tube 12 and provide for fluid communication between combustion zone 26 and fuel combustion zone 38. The arrows 44 illustrate the flow direction of the preheated fuel from within the combustion zone 26, through the apertures 32 and into fuel combustion zone 38, wherein the preheated fuel and preheated oxidant are mixed to form a combustion mixture and in which combustion occurs. The arrows 46 illustrate the flow direction of the preheated oxidant that passes into the fuel combustion zone 38.

The spacing, orientation and size of the apertures are such that as to provide for the introduction of increments of preheated fuel into the fuel combustion zone 38 in amounts and at such rates as to provide rapid and complete mixing of the preheated fuel and preheated oxidant. Due to this rapid and complete mixing, the oxidation reaction between the preheated oxidant and the preheated fuel is not limited by mixing. Thus, generally, it is the combination of the fuel introduction geometry, as defined by the structure of the fuel tube 12 at its combustion zone 26, and the oxidant introduction zone geometry, as defined by the oxidant tube 14 that forms the fuel combustion zone 38, that provide for a preheated fuel velocity (see arrows 44) and a preheated oxidant velocity (see arrows 46) suitable for the desired rapid and complete mixing of the two fluids.

The apertures 32 are spaced apart in the axial direction of the fuel tube 12, and they may be positioned in their respective radial planes at different orientations along the length of the fuel tube 12. For example, the position of the apertures 32 may alternate 180 degrees in the radial planes along the length of the fuel tube 12, or they may alternate 120 degrees, or 90 degrees and so forth. Therefore, the position of the apertures in fuel tube 12 may be such that their orientation in the radial planes alternate along the length of the fuel tube 12 with their orientations varying from 0 degrees to 360 degrees or from 30 degrees to 180 degrees. It is preferred, however, for the aperture orientations to alternate at from about 60 to 120 degrees along the length of the fuel tube 12.

A feature of the invention is for the structure of the heat transfer system 10 to provide for a preheated oxidant temperature and a preheated fuel temperature such that when the combustion mixture is formed the temperature of the combustion mixture exceeds the auto-ignition temperature of the combustion mixture. If the velocity of the preheated oxidant passing through the fuel combustion zone 38 is sufficient, then the mixing of the small increments of the preheated fuel with the preheated oxidant at a temperature exceeding the auto-ignition temperature of the resulting combustion mixture results in the fuel oxidizing or combusting without the formation of a flame. This flameless combustion occurs at a significantly lower temperature than when combustion occurs with a flame.

Process tube 16 is external to and surrounds oxidant tube 14 in a manner so as to define a process fluid introduction zone 50 along the outside of oxidant tube 16. The fluid introduction zone 50 provides a conduit through which a process fluid may pass. Included within the process fluid introduction zone 50 are a process fluid heating zone 52 and an oxidant/fuel heating zone 54. In typical embodiments, the process fluid heating zone and the oxidant/fuel heating zone are at the ends of the process fluid introduction zone. The process fluid heating zone 52 extends from process fluid inlet 56 to process fluid outlet 58. The process fluid outlet 58 provides for fluid communication between the process fluid heating zone 52 and the oxidant/fuel heating zone 54, and it may be an imaginary transition area from one zone to another zone within the conduit formed by the process tube 16 surrounding the oxidant tube 14. The oxidant/fuel heating zone 54 extends from the process fluid outlet 58 to process tube discharge outlet 60 of process tube 16. The process fluid inlet 56 provides for the introduction of the process fluid into the process fluid heating zone 52 and the process fluid outlet 58 provides for the introduction of the heated process fluid passing from the process fluid heating zone 52 to oxidant/fuel heating zone 54.

A feature of the heat transfer system 10 is that the process fluid heating zone 52 surrounds the oxidant tube 14 and extends along the fuel combustion zone 38 so that the configuration provides for the heat exchange relationship between the fuel combustion zone 38 and process fluid heating zone 52. The burning of the combustion mixture within the fuel combustion zone 38 results in the release of heat energy that is transferred into the process fluid that is passing through the process fluid heating zone 52. The curvy arrows 62 depict the flow of heat energy from the fuel combustion zone 38 into the process fluid that passes through the process fluid heating zone 52. A process fluid is introduced into the process fluid heating zone 52 through process fluid inlet 56 and as it passes through the process fluid heating zone 52 it gains heat.

Another feature of the heat transfer system 10 is that the oxidant/fuel heating zone 54 surrounds the oxidant tube 14 and extends along the oxidant preheating zone 36 so that the configuration provides for the heat exchange relationship between oxidant/fuel heating zone 54 and the oxidant preheating zone 36. It is an additional feature of this configuration that the oxidant/fuel heating zone 54 is in heat exchange relationship with the fuel preheating zone 24. The heated process fluid that passes from the process fluid heating zone 52 into and then through the oxidant/fuel heating zone 54 provides for the heat energy that is used to preheat the fuel and oxidant prior to their introduction into the fuel combustion zone 38. Depicted by the curvy arrows 64 is the flow of heat energy from the heated process fluid passing through the oxidant/fuel heating zone 54 to the oxidant fluid passing through oxidant preheating zone 36 and to the fuel passing through fuel preheating zone 26. By preheating the oxidant and/or fuel in the heat transfer system 10, the capital expenditure can be reduced. Supplementary heat exchangers that may be needed to recover heat from one or more of the streams or to provide heat to one or more of the streams outside of the heat transfer system 10 may be designed differently, including the use of lower cost materials, or may not be necessary.

It is a further aspect of the invention that the configuration of the oxidant/fuel heating zone 54, the oxidant preheating zone 36 and the fuel preheating zone 24 be such that the fuel and oxidant are sufficiently heated so as to provide the preheated fuel and preheated oxidant that respectively have a preheated fuel temperature and a preheated oxidant temperature such that when the preheated fuel and preheated oxidant are mixed to form the combustion mixture within the fuel combustion zone 38 the combustion mixture temperature exceeds the auto-ignition temperature of the combustion mixture. Thus, the preheating section 66 of the heat transfer system 10 may have a configuration, including a preheating section length 68, that provides for the aforementioned heat transfer from the heated process fluid to the fuel and oxidant.

Typically a fuel is selected for use in the operation of the heat transfer system 10, wherein the auto-ignition temperature of the combustion mixture comprising the fuel is in the range of from 400° C. (752° F.) to 1500° C. (2732° F.), or from 500° C.(932° F.) to 1400° C. (2552° F.), preferably, from 600° C. (1112° F.) to 1350° C.(2462° F.) and, most preferably, from 700° C.(1292° F.) to 1300° C. (2372° F.).

The temperatures at which the oxidant and fuel are introduced into the heat transfer system 10 may be in a broad range of temperatures including temperatures that approach ambient temperatures. The oxidant and fuel may also be heated to above ambient temperature prior to their introduction into the heat transfer system. Thus, the temperature of the oxidant to be introduced into the heat transfer system 10 through oxidant inlet 40 may be in the range of from about −30° C. (−22° F.) to about 2000° C. (3632° F.), or from about −10° C. (14° F.) to about 1200° C. (2192° F.) or from about −10° C.(14° F.) to about 400° C.(752° F.). The temperature of the oxidant introduced into the heat transfer system may be at a temperature higher than −30° C., higher than −20° C., higher than −10° C. or higher than 0° C. The temperature of the oxidant introduced into the heat transfer system may be at most 3000° C., at most 2000° C., at most 1200° C., or at most 1000° C. In some embodiments, the oxidant may be preheated prior to its introduction into the oxidant preheating zone 36 of the heat transfer system 10.

While the temperatures at which the oxidant and fuel are introduced into the heat transfer system will impact the design and geometry of the preheating section 66, the preheating section length 68 will generally be less than the process heating length 70 of the fuel combustion section 72. The relative lengths between the preheating section length 68 and the process heating length 70 will depend in large part upon the temperature at which the oxidant and fuel are introduced into the heat transfer system; but, generally, the ratio of the process heating length 70 and preheating section length 68 will exceed 1:1, and, more typically, it will exceed 2:1, and most typically, it will exceed 3:1. In other embodiments, the ratio of the process heating length 70 and preheating section length 68 will exceed 0.01:1, 0.05:1 or 0.5:1. In additional embodiments, the ratio of the process heating length 70 and preheating section length 68 will exceed 1:0.5, 1:0.05, 1:0.01.

The process fluids to be heated by use of the heat transfer system 10 may be any process fluid to be heated for any purpose. However, the heat transfer system has particularly beneficial application when used in heating of process fluids that are chemical reactant feedstocks. And, especially, the heat transfer system of the invention has particular application in dehydrogenation processes such as ethylbenzene dehydrogenation processes for the manufacture of styrene. In such an application, the process fluid to be heated using the heat transfer system 10 comprises ethylbenzene. The process fluid may further comprise steam, and it may further comprise styrene and other typical components of a dehydrogenation reactor feedstock. For the dehydrogenation application, the process fluid introduced into the process fluid heating zone 52 of heat transfer system 10 through process fluid inlet 56 typically has a temperature in the range of from 260° C.(500° F.) to 704° C.(1300° F.), more typically, from 315° C.(600° F.) to 677° C.(1250° F.), and, most typically, from 427° C.(800° F.) to 649° C.(1200° F.).

The typical temperature increase of the process fluid heated by use of the heat transfer system 10 may be in the range of from 10° C. to 500° C., but, more typically, the temperature increase is in the range of from 50° C. to 300° C., and most typically, from 100° C. to 250° C.

The oxidant introduction zone is external to the fuel introduction zone, and the process fluid introduction zone is external to the oxidant introduction zone.

Figure 2:
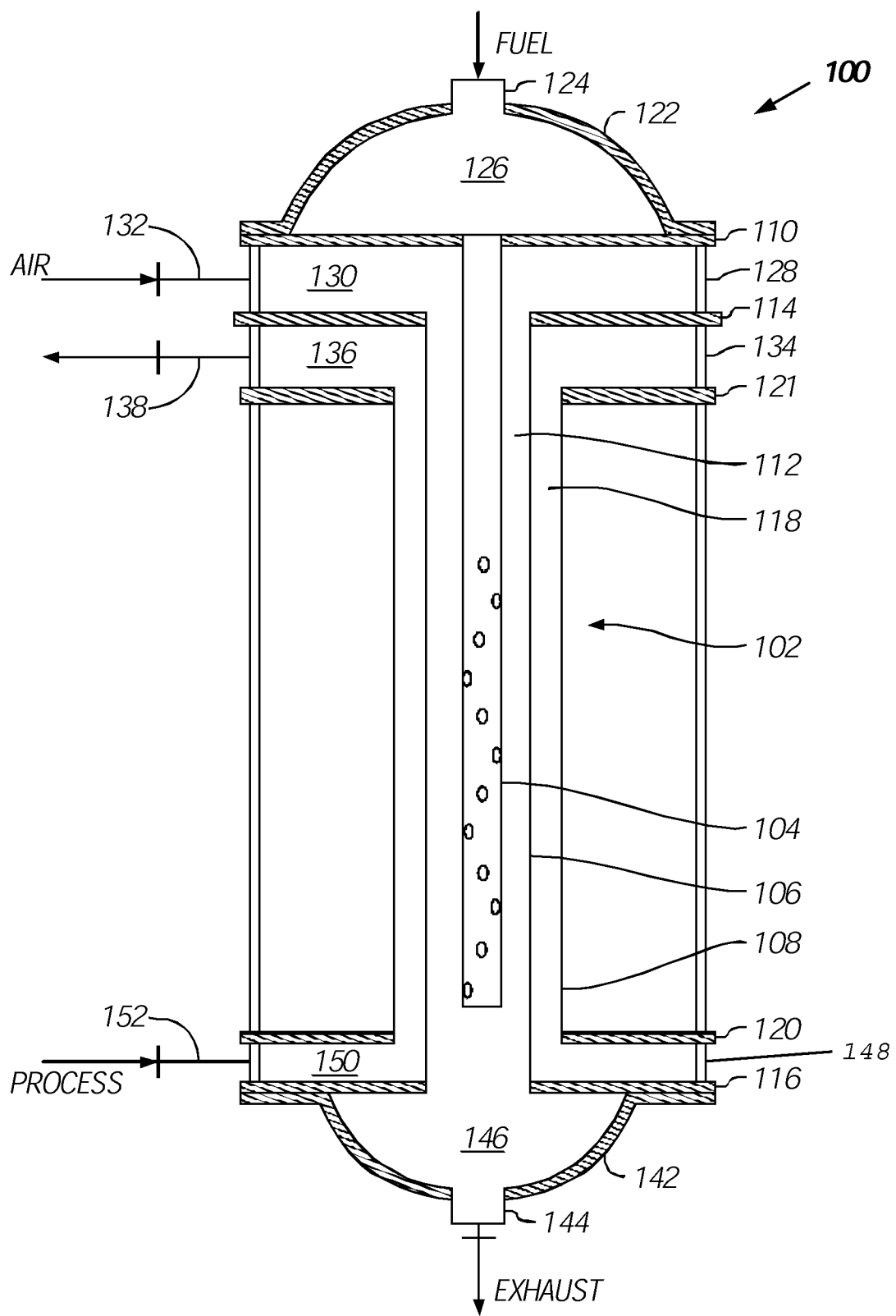
FIG. 2 is a sectional view of the heat transfer system incorporated into a manifolded heat exchange system.

Referring now to FIG. 2, in which is presented a sectional view of the heat transfer system described above that is incorporated into a heat exchange system 100. For illustration purposes, a single heat transfer system 102, comprising three tubes that are in concentric relationship and integrated together using tube sheets, is shown. It is understood, however, that the heat exchange system 100 may be a heat exchanger and will normally include a plurality of the three tube heat transfer systems 102 bundled together to form a tube bundle.

The heat transfer system 102 comprises three tubes, including a fuel tube 104, an oxidant or air tube 106, and a process tube 108. Fuel tube 104 passes through fuel tube sheet 110 to which it is fixedly attached. Air tube 106 is concentrically placed around fuel tube 104, which extends away from fuel tube sheet 110, to form a first annulus 112. The inlet end of air tube 106 passes through the inlet air tube sheet 114 and is fixedly attached thereto, and the outlet end of air tube 106 passes through the outlet air tube sheet 1 16 to which it is fixedly attached. The process tube 108 is concentrically placed around air tube 106 to form a second annulus 118. The inlet end of process tube 108 passes through inlet process tube sheet 120 and is fixedly attached thereto, and the outlet end of process tube 108 passes through outlet process tube sheet 121 to which it is fixedly attached.

The tube sheets 110, 114, 116, 120, and 121 are connected together to provide for the desired flows of the fuel, air and process fluids through the heat exchanger 100. Shell cover 122, having a fuel inlet nozzle 124 for introducing fuel, is sealantly connected to fuel tube sheet 110 to provide for a fuel manifold 126 for introducing fuel into the fuel tube 104. Spaced apart from fuel tube sheet 110 by spacer 128 is inlet air tube sheet 114 which together they provide for an air manifold 130 for introducing air into the air tube 106. Air inlet nozzle 132 provides for the introduction of air into the air manifold 130. Spaced apart from inlet air tube sheet 114 by spacer 134 is outlet process tube sheet 121 which together they provide for a heated process fluid manifold 136. Process fluid outlet nozzle 138 provides for the removal of the heated process fluid from the heated process fluid manifold 136.

Shell cover 142 having an exhaust nozzle 144 for removing combustion exhaust is sealantly connected to the outlet air tube sheet 116 to provide for an exhaust manifold 146 for collecting the combustion exhaust generated by the combustion of the fuel and air in the heat transfer system 102. Spaced apart from the outlet air tube sheet 116 by spacer 148 is inlet process tube sheet 120 which together they provide for a process fluid manifold 150. Process fluid feed nozzle 152 provides for the introduction of a process fluid feed into the process fluid manifold 150.

Figure 3:
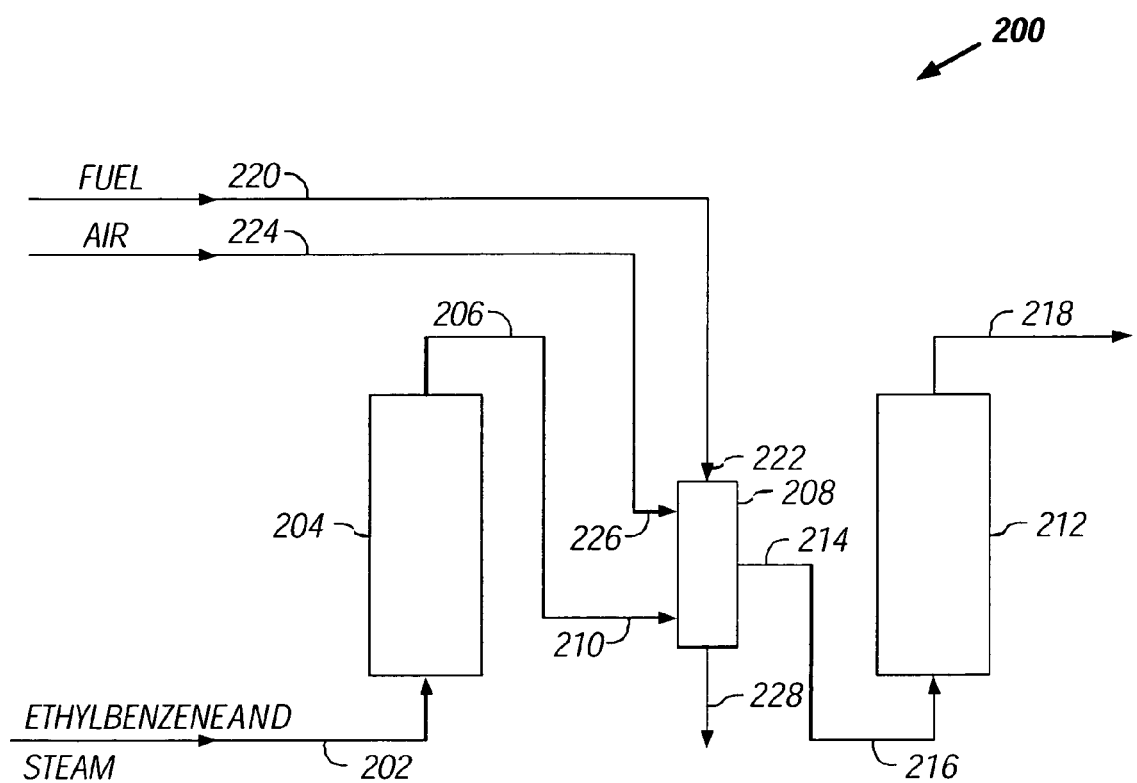
FIG. 3 is a simplified process flow diagram showing a use of the heat transfer system in a catalytic process.

Presented in FIG. 3 is a simplified process flow diagram of a process system 200, which incorporates the use of the heat transfer system described above. The process system 200 is any process that may productively or suitably exploit the advantages of the herein-described heat transfer system. One such process is a catalytic dehydrogenation process for the dehydrogenation of ethylbenzene to yield styrene. Other processes as previously mentioned may include steam reforming and olefins cracking.

In the process depicted in FIG. 3, a process feedstock containing steam and ethylbenzene is charged to dehydrogenation reactor 204 via conduit 202. The dehydrogenation reactor 204 defines a dehydrogenation reaction zone containing a suitable dehydrogenation catalyst such as any of the well know iron oxide based dehydrogenation catalysts, and the dehydrogenation reactor 204 provides means for contacting under suitable dehydrogenation reaction conditions the process feedstock with the dehydrogenation catalyst. A dehydrogenation reactor effluent is discharged from dehydrogenation reactor 204 through conduit 206 and introduced into heat transfer system 208 through its process fluid inlet 210.

Because the dehydrogenation reaction is an endothermic reaction, the dehydrogenation reactor effluent will have a lower temperature than that of the process feedstock charged to the dehydrogenation reactor 204. The heat transfer system 208 is used to add heat energy to the dehydrogenation reactor effluent to raise its temperature prior to introducing the dehydrogenation reactor effluent into the second stage dehydrogenation reactor 212. The heated process fluid or reheated dehydrogenation reactor effluent passes from heat transfer system 208 through its discharge outlet 214 and conduit 216 to be introduced as a feed into second stage dehydrogenation reactor 212. The second stage dehydrogenation reactor 212 defines a dehydrogenation reaction zone containing a suitable dehydrogenation catalyst such as any of the well know iron oxide based dehydrogenation catalysts, and it provides means for contacting under suitable dehydrogenation reaction conditions the reheated dehydrogenation reactor effluent with the dehydrogenation catalyst. A dehydrogenation reactor effluent is discharged from second stage dehydrogenation reactor 212 through conduit 218.

Fuel is introduced into the heat transfer system 208 by way of conduit 220 and through fuel inlet 222. Air is introduced into the heat transfer system 208 by way of conduit 224 and through oxidant inlet 226. The combustion exhaust from the combustion zone (not shown) of the heat transfer system 208 is discharged by way of conduit 228.

It is noted that the heat transfer system of the invention may be integrated into any type of process system requiring the introduction of heat energy into a process fluid. The catalytic process system 200 of FIG. 3 only shows a single heat transfer system unit that is interposed between two reactor stages, but it is recognized that any number of heat transfer system units may be combined with any number of reactor stages in any suitable arrangement.

That which is claimed is:

1. A process system, comprising:
a first heat transfer system for combusting of a fuel and for heating of a process fluid, wherein said heat transfer system comprises:
A fuel tube having a length and a tube wall that define a fuel introduction zone wherein along said length and within said fuel introduction zone is included a fuel preheating zone and a combustion zone, wherein said fuel preheating zone includes a fuel inlet for introducing said fuel into said fuel preheating zone and a fuel outlet for introducing a preheated fuel from said fuel preheating zone into said combustion zone, and wherein along said combustion zone and through said tube wall is a plurality of apertures;
an oxidant tube that is external to and surrounding said fuel tube so as to thereby define an oxidant introduction zone along said length of said fuel tube, wherein said oxidant introduction zone includes an oxidant preheating zone and a fuel combustion zone, wherein said oxidant preheating zone includes an oxidant inlet for introducing an oxidant into said oxidant preheating zone and an oxidant outlet for introducing a preheated oxidant from said oxidant preheating zone into said fuel combustion zone, and wherein said plurality of apertures provide for fluid communication between said combustion zone and said fuel combustion zone; and
a process tube that is external to and surrounding said oxidant tube so as to thereby define a process fluid introduction zone along said oxidant tube, wherein said process fluid introduction zone includes a process fluid heating zone and an oxidant/fuel heating zone, wherein said process fluid heating zone is in heat exchange relationship with said fuel combustion zone and includes a process fluid inlet for introducing said process fluid into said process fluid heating zone and a process fluid outlet for introducing a heated process fluid from said process fluid heating zone into said oxidant/fuel heating zone, and wherein said oxidant/fuel heating zone is in heat exchange relationship with both of said oxidant preheating zone and said fuel preheating zone and includes a discharge outlet for discharging from said oxidant/fuel heating zone said heated process fluid.

2. A process system as recited in claim 1, wherein said apertures of said plurality of apertures are spaced along said combustion zone of said length of said fuel tube and are sized so as to provide for the introduction of increments of said preheated fuel into said fuel combustion zone such that when said increments of said preheated fuel are mixed with said preheated oxidant a combustion mixture is formed and a combustion occurs which releases heat without a flame.

3. A process system as recited in claim 2, wherein the heat exchange relationship between said process fluid heating zone and said fuel combustion zone provides for the heating of said process fluid to yield said heated process fluid by the heat released by said combustion.

4. A process system as recited in claim 3, wherein the heat exchange relationship between said oxidant/fuel heating zone and both of said oxidant preheating zone and said fuel preheating zone provides for the heating of said fuel to yield said preheated fuel and for the heating of said oxidant to yield said preheated oxidant by the transfer of heat from said heated process fluid.

5. A process system as recited in claim 4, wherein the heat exchange relationship between said oxidant/fuel heating zone and both of said oxidant preheating zone and said fuel preheating zone further provides for a preheated oxidant temperature of said preheated oxidant and a preheated fuel temperature of said preheated fuel such that said combustion mixture has a combustion mixture temperature exceeding the auto-ignition temperature of said combustion mixture.

6. A process system as recited in claim 5, wherein said fuel introduction zone is further characterized by a fuel introduction geometry, wherein said oxidant introduction zone is further characterized by an oxidant introduction zone geometry, wherein said fuel introduction geometry and said oxidant introduction zone geometry are such as to provide for a preheated fuel velocity and a preheated oxidant velocity that prevent the formation of said flame.

7. A process system as recited in claim 6, further comprising:
first reactor means for contacting under reaction conditions said heated process fluid with a catalyst, wherein said first reactor means includes a first reactor inlet for receiving said heated process fluid as a first reactor feed and a first reactor outlet for discharging a first reactor effluent, wherein said reactor inlet is fluidly connected to said discharge outlet.

8. A process for the direct heating of a process fluid by the flameless combustion of a fuel, said process comprises:

introducing said fuel into a fuel tube having a length and a tube wall that define a fuel introduction zone wherein along said length and within said fuel introduction zone is included a fuel preheating zone and a combustion zone, wherein said fuel preheating zone includes a fuel inlet for introducing said fuel into said fuel preheating zone and a fuel outlet for introducing a preheated fuel from said fuel preheating zone into said combustion zone, and wherein along said combustion zone and through said tube wall is a plurality of apertures;

introducing an oxidant into an oxidant tube that is external to and surrounding said fuel tube so as to thereby provide an oxidant introduction zone along said length of said fuel tube, wherein said oxidant introduction zone includes an oxidant preheating zone and a fuel combustion zone, wherein said oxidant preheating zone includes an oxidant inlet for introducing said oxidant into said oxidant preheating zone and an oxidant outlet for introducing a preheated oxidant from said oxidant preheating zone into said fuel combustion zone, and wherein said plurality of apertures provide for fluid communication between said combustion zone and said fuel combustion zone;

introducing said process fluid into a process tube that is external to and surrounding said oxidant tube so as to thereby provide a process fluid introduction zone along said oxidant tube, wherein said process fluid introduction zone includes a process fluid heating zone and an oxidant/fuel heating zone, wherein said process fluid heating zone is in heat exchange relationship with said fuel combustion zone and includes a process fluid inlet for introducing said process fluid into said process fluid heating zone and a process fluid outlet for introducing a heated process fluid from said process fluid heating zone into said oxidant/fuel heating zone, and wherein said oxidant/fuel heating zone is in heat exchange relationship with both of said oxidant preheating zone and said fuel preheating zone and includes a discharge outlet for discharging from said oxidant/fuel heating zone said heated process fluid;

discharging from said oxidant/fuel heating zone said heated process fluid; and discharging from said fuel combustion zone a combustion exhaust.

9. A process as recited in claim 8, further comprising:

introducing increments of said preheated fuel into said fuel combustion zone such that a combustion mixture is formed and a combustion occurs which releases heat without a flame.

\* \* \* \* \*